(12) United States Patent
Shah et al.

(10) Patent No.: US 7,969,907 B2
(45) Date of Patent: Jun. 28, 2011

(54) SYSTEM FOR SCHEDULING SCANS OF INTERIOR NODES OF A NETWORK DOMAIN FOR REACHABILITY EVENTS

(75) Inventors: Himanshu Shah, Milpitas, CA (US); Gargi Nalawade, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 894 days.

(21) Appl. No.: 11/059,010

(22) Filed: Feb. 16, 2005

(65) Prior Publication Data

US 2006/0182115 A1   Aug. 17, 2006

(51) Int. Cl.
*H04L 12/28* (2006.01)
*H04L 12/56* (2006.01)

(52) U.S. Cl. .............. 370/254; 370/395.4; 370/401

(58) Field of Classification Search .......... 370/351–430, 370/254–258
See application file for complete search history.

(56) References Cited

U.S. PATENT DOCUMENTS

| | | | |
|---|---|---|---|
| 4,910,733 A * | 3/1990 | Sommani et al. ............ 370/390 |
| 5,276,680 A * | 1/1994 | Messenger .................. 370/311 |
| 5,400,329 A * | 3/1995 | Tokura et al. ............... 370/232 |
| 5,917,820 A | 6/1999 | Rekhter |
| 6,006,016 A | 12/1999 | Faigon et al. |
| 6,101,194 A * | 8/2000 | Annapareddy et al. ....... 370/447 |
| 6,269,099 B1 | 7/2001 | Borella et al. |
| 6,339,595 B1 | 1/2002 | Rekhter et al. |
| 6,463,061 B1 | 10/2002 | Rekhter et al. |
| 6,553,423 B1 | 4/2003 | Chen |
| 6,628,614 B2 | 9/2003 | Okuyama et al. |
| 6,987,728 B2 * | 1/2006 | Deshpande ................... 370/229 |
| 6,990,070 B1 * | 1/2006 | Aweya et al. ................. 370/230 |
| 7,006,821 B2 * | 2/2006 | Tee ................. 455/421 |
| 7,263,078 B2 * | 8/2007 | Krantz et al. ............... 370/328 |
| 7,280,537 B2 * | 10/2007 | Roy ............................ 370/381 |
| 2002/0044549 A1 * | 4/2002 | Johansson et al. ........... 370/255 |
| 2002/0177910 A1 | 11/2002 | Quarterman et al. |
| 2003/0023701 A1 * | 1/2003 | Norman et al. .............. 370/378 |
| 2003/0043796 A1 * | 3/2003 | Okuyama et al. ............ 370/389 |
| 2003/0156603 A1 * | 8/2003 | Rakib et al. ................. 370/485 |
| 2003/0202501 A1 * | 10/2003 | Jang ............................ 370/346 |
| 2004/0120278 A1 * | 6/2004 | Krantz et al. ............... 370/328 |
| 2005/0068968 A1 * | 3/2005 | Ovadia et al. ............... 370/396 |
| 2005/0074001 A1 | 4/2005 | Mattes et al. |
| 2005/0074003 A1 | 4/2005 | Ball et al. |

(Continued)

FOREIGN PATENT DOCUMENTS

EP    06 71 9874    5/2009

OTHER PUBLICATIONS

Y. Rekhter and T. Li, RFC 1171, entitled a Border Gateway Protocol 4 (BGP-4), pp. 1-54, Mar. 1995.

(Continued)

*Primary Examiner* — Chirag G Shah
*Assistant Examiner* — Joshua Smith
(74) *Attorney, Agent, or Firm* — Cesari and McKenna, LLP

(57) ABSTRACT

An arrangement for scheduling scans of internal network nodes for reachability events by a border node of a network domain, schedules the scans according to the rate at which reachability notifications are received by the node. As the rate at which notifications are received increases, the interval between scans also increases. Conversely, as the rate of notifications decreases, the interval also decreases.

21 Claims, 6 Drawing Sheets

U.S. PATENT DOCUMENTS

2006/0126495 A1* 6/2006 Guichard et al. ............. 370/216
2006/0180438 A1 8/2006 Mosli et al.
2006/0182038 A1 8/2006 Nalawade et al.

OTHER PUBLICATIONS

Perlman, Radia, Interconnections: Bridges and Routers, Section 10.2.3, pp. 323-329, Addison Wesley longman, Inc., 1992.
Rekhter, Y., et al., Internet Draft, entitled a Border Gateway Protocol 4 (BGP-4) (draft-ietf-idr-bgp4-20.txt, Mar. 1995, pp. 1-86.
http://www.cisco.com/un d/cc/t...s120/12cgcr/npl_c/lcprt1/lcbgp. htm, "Configuring BGP" Copyright 1989-1999 pp. 1-44.
Tanenbaum, Andrew S., "Computer Networks" Third Edition; Chapter 1, Section 1.4.2, "The TCP/IP Reference Model"; Prentice Hall PTR, 1996, New Jersey, pp. 35-38.
Bates, T. et al., Internet Draft, entitled Multiprotocol Extensions for BGP-4 (draft-ietf-idr-bgp4-multiprotocol-v2.02.txt), Aug. 1999, pp. 1-10.
Chandra, R. et al., Internet Draft, entitled Capabilities Negotiation with BGP-4 (draft-ietf-idr-bgp4-cap-neg-03.txt), pp. 1-4.
Notification of Transmittal of the International Search Report or the Declaration and Written Opinion of the International Searching Authority, Mailed on Jan. 31, 2007, International Application No. PCT/US06/03221, International Filing Date Jan. 30, 2006, 11 pages.
White, Russ, "High Availability in Routing", The Internet Protocol Journal, Cisco Systems, Mar. 2004, pp. 2-14.

* cited by examiner

SYSTEM FOR SCHEDULING SCANS OF INTERIOR NODES OF A NETWORK DOMAIN FOR REACHABILITY EVENTS

CROSS REFERENCE TO RELATED APPLICATION

U.S. Patent application of David Ball et al. for DISTRIBUTED SOFTWARE ARCHITECTURE FOR IMPLEMENTING BGP, Ser. No. 10/677,797, filed Oct. 2, 2003, now published as U.S. Patent Publication No. 2005/0074003, published Apr. 7, 2005, and assigned to the assignee of this application, the contents of which are incorporated herein by reference.

FIELD OF THE INVENTION

This invention relates to scheduling of the processing of reachability events in a unit such as a router employing the Border Gateway Protocol (BGP). More particularly it relates to a system in which the unit scans for such events after dynamically adjustable intervals so as to minimize instabilities in this system and yet process these events without undue delay.

BACKGROUND OF THE INVENTION

A typical network to which the invention applies comprises a large number of network nodes, e.g., work stations, organized in autonomous domains. Communications between bordering (logically) domains are, to some extent, organized by units such as routers that employ the Border Gateway Protocol. With this protocol a router communicates with a peer router in a neighboring domain by means of a connection such as TCP/IP to provide the latter router with the next-hop IP addresses of routers to which data intended for network nodes within the domain, or beyond, should be directed. The Border Gateway Protocol (BGP) is described in RFC 1771. Specifically, a BGP router advertises to its peers updates of the paths over which traffic should be directed to search particular nodes located within the domain or through the domain to another domain.

The present invention relates to the processing of "reachability events", i.e., changes in the status of units within the domain that may affect paths advertised to the peers. For example, a "next-hop" node within the domain or another node further along the path to the recipient of messages may have failed or otherwise be unavailable; or if previously unavailable has become available. Notifications of many, if not most, of these events are ordinarily received in messages transmitted by other nodes in the domain. To provide certainty, the BGP unit might periodically scan all the next-hop units in the paths advertised by the unit to its peers. However the scanning interval then has to be unduly long to cope with churning.

SUMMARY OF THE INVENTION

In accordance with the invention the scanning interval is dynamic. The scanning process is based on the receipt of notices of reachability events. Initially the BGP unit assigns a standard delay interval between the receipt of a notice and the subsequent scan. The interval increases when reachability events are rapidly received and it decreases when the time between received events increases. The rate at which the interval increases or decreases may be exponential or additive or any other desirable function of the rate at which reachability events are received. For example, when it first receives a notification of a reachability event a "penalty" delay is added to the standard interval so that the next scan will not take place until a delay interval equal to the standard interval plus the penalty increment has expired after the first scan. If notification of another event is received before the next scan, another penalty increment is added to the interval after which the second scan can begin. Thus the interval between scans is dynamically increased in accordance with the rapidity with which event notifications are received. Such rapidity is generally an indication of churning. Therefore, by delaying the next scan, the internal BGP waits until the internal system has settled down.

Conversely, if the rate at which the reachability announcements are received by the BGP unit decreases sufficiently, the waiting time for the next scan will decrease until it decays to zero.

This arrangement applies to all reachability event notifications, whether they are received in unsolicited messages from other nodes in the domain are or as the result of scans. Thus, if a scan uncovers one or more reachability events, the next scan will be delayed in accordance with the number of such events. Specifically the penalty interval is applied to each of the events and the next scan is delayed accordingly.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
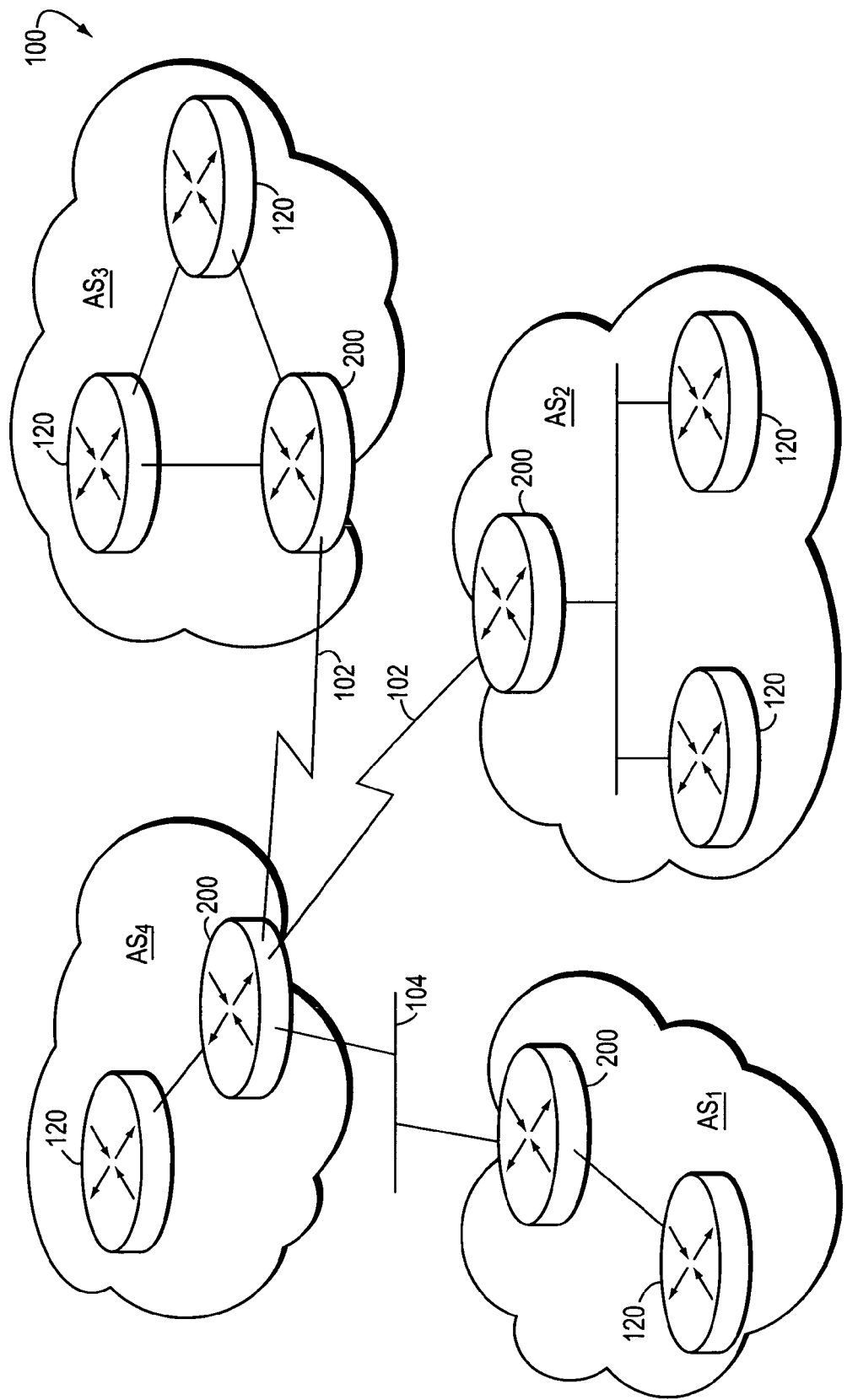
FIG. 1 is a schematic block diagram of a computer network.

FIG. 1 is a schematic block diagram of a computer network 100 comprising a plurality of routing domains or autonomous systems interconnected by intermediate nodes, such as conventional intradomain routers 120 and interdomain routers 200. The autonomous systems may include various routing domains ($AS_{1-4}$) interconnected by the interdomain routers. The interdomain routers 200 are further interconnected by shared medium networks, such as local area networks (LANs) 104, and point-to-point links 102, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
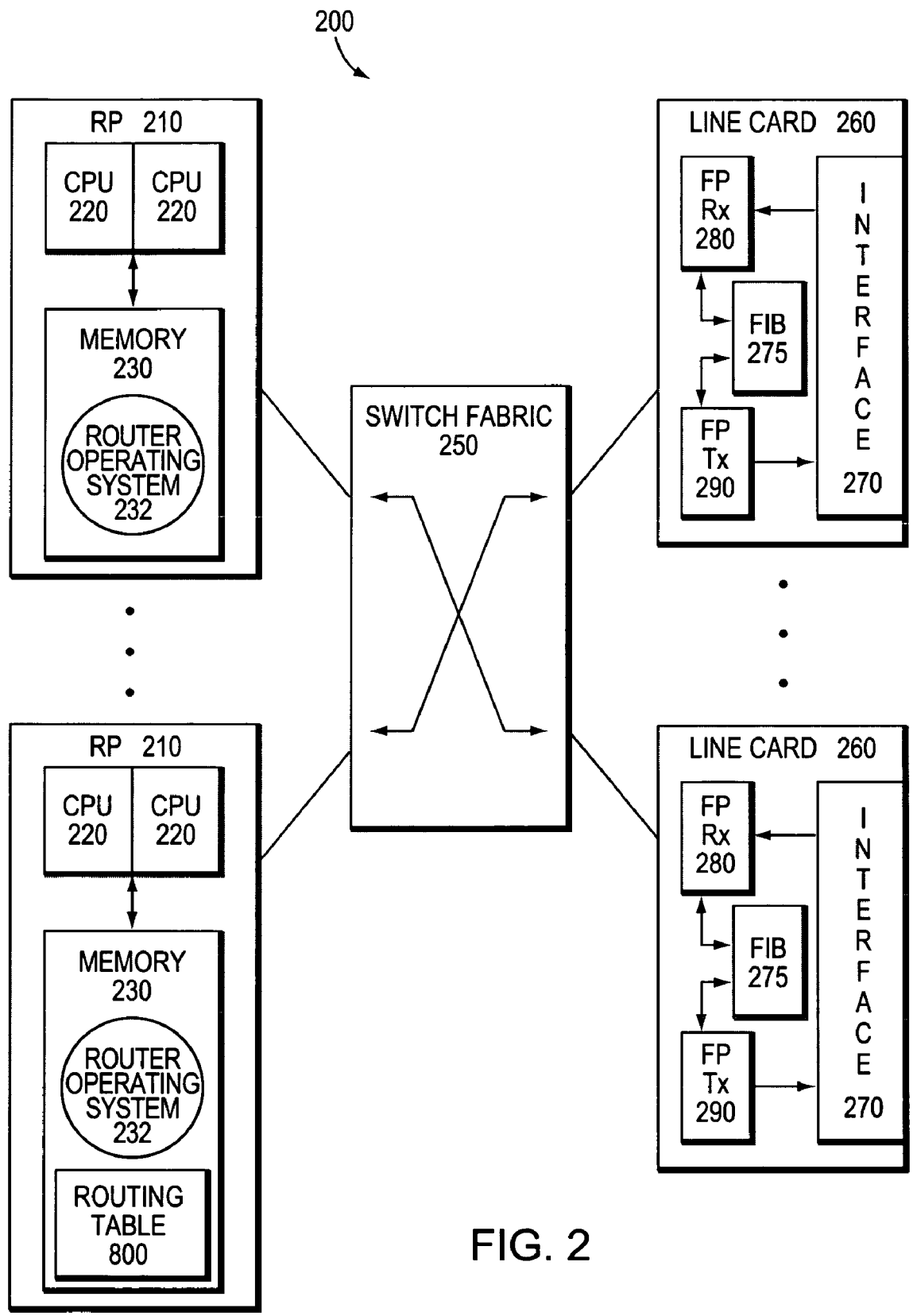
FIG. 2 is a schematic block diagram of an interdomain router.

FIG. 2 is a schematic block diagram of an interdomain router 200 that may be advantageously used with the present invention. The interdomain router 200 comprises a plurality of loosely coupled processors 210 connected to a plurality of ingress and egress line cards (line cards 260) via a high-speed switch fabric 250 such as, e.g., a crossbar interconnection or high-speed bus. Those skilled in the art will recognize that other router platforms such as, e.g., a plurality of independent nodes interconnected as a multi-node cluster, could be used in accordance with the invention. In this context, the term "node" denotes a chassis adapted to hold a plurality of modules,-including processors and line cards.

The processors 210 are illustratively route processors (RPs), each having a dedicated memory 230. The memory 230 may comprise storage locations addressable by the processor for storing software programs and data structures associated with the distributed routing protocol architecture. Each processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes executing on the processor. It will be apparent to those skilled in the art that other processor and memory means, including various computer readable media, may be used for storing and executing program instructions pertaining to the inventive architecture described herein.

In the illustrative embodiment, each RP 210 comprises two central processing units (CPUs 220), e.g., Power-PC 7460 chips, configured as a symmetric multiprocessing (SMP) pair. The CPU SMP pair is adapted to run a single copy of the router operating system 232 and access its memory space 230. As noted, each RP has a memory space that is separate from the other RPs in the router 200. The processors communicate using an interprocess communication (IPC) mechanism. In addition, each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on interface 270 of an ingress line card in order to determine to which RP 210 to forward the packet. To that end, the FP Rx renders the forwarding decision using an internal forwarding information base, IFIB, of a FIB 275. Likewise, the FP Tx 290 performs lookup operations (using FIB 275) on a packet transmitted from the router via interface 270 of an egress line card. In accordance with the invention, each FP Tx 290 also includes an adaptive timing unit 292 described below.

Figure 3:
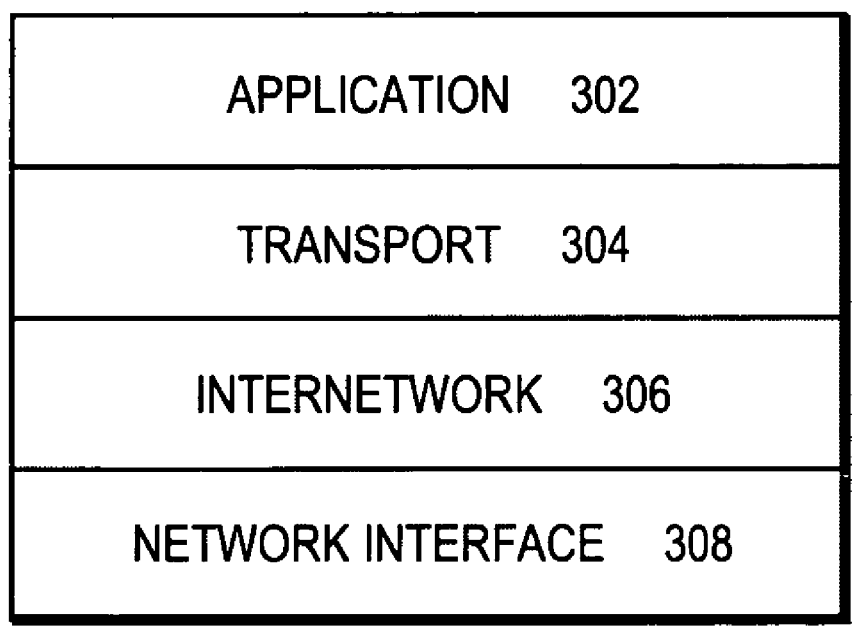
FIG. 3 is a schematic block diagram of a conventional network protocol stack.

A key function of the interdomain router 200 is determining the next node to which a packet is sent; in order to accomplish such "routing," the interdomain routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the TCP protocol, which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that interdomain routers utilize so that they can cooperate to calculate paths through the computer network 100. An interdomain routing protocol, such as the Border Gateway Protocol version 4 (BGP), is used to perform interdomain routing (for the internetwork layer) through the computer network. The interdomain routers 200 (hereinafter "peer routers") exchange routing and reachability information among the autonomous systems over a reliable transport layer connection, such as TCP. An adjacency is a relationship formed between selected peer routers for the purpose of exchanging routing messages and abstracting the network topology. The BGP protocol uses the TCP transport layer 304 to ensure reliable communication of routing messages among the peer routers.

In order to perform routing operations in accordance with the BGP protocol, each interdomain router 200 maintains a routing table 800 that lists all feasible paths to a particular network. The routers further exchange routing information using routing update messages 400 when their routing tables change. The routing update messages are generated by an updating router to advertise best paths to each of its neighboring peer routers throughout the computer network. These routing updates allow the BGP routers of the autonomous systems to construct a consistent and up-to-date view of the network topology.

Figure 4:
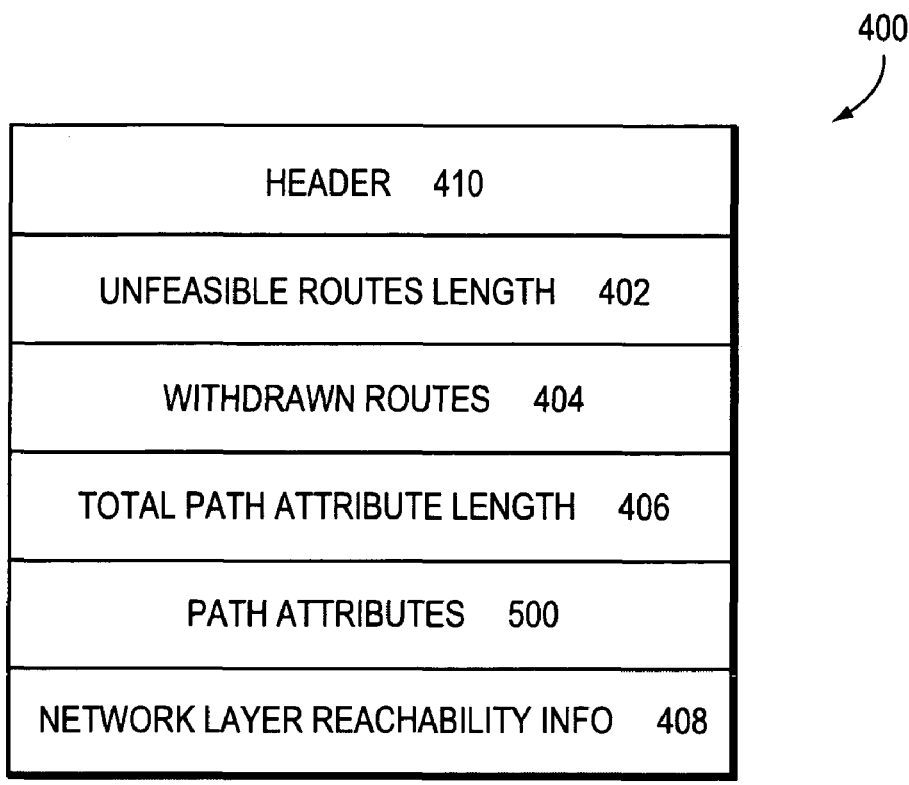
FIG. 4 is a schematic block diagram of a conventional BGP update message.

FIG. 4 is a schematic block diagram of a conventional BGP update message 400 comprising a plurality of fields appended to a header 410. An unfeasible routes length field 402 indicates the total length of a withdrawn routes field 404, which illustratively contains a list of IP address prefixes for the routes being withdrawn from service. A total path attribute length field 406 indicates the total length of a path attributes field 500 and a network layer reachability information field 408 illustratively contains a list of IP (IPv4 or IPv6) address prefixes. Note that the combination of a set of path attributes and a prefix is referred to as a "route"; the terms "route" and "path" may be used interchangeably herein. The format and function of the update message 400 is described in *RFC 1771 and Interconnections, Bridges and Routers*.

Figure 5:
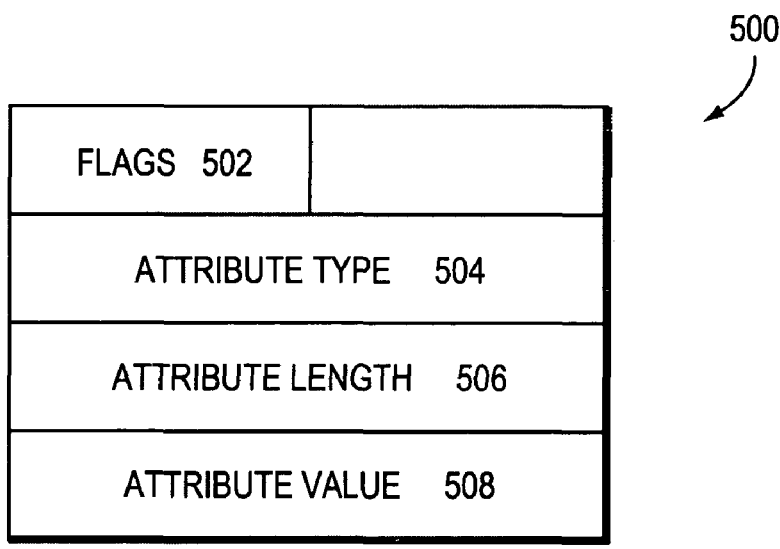
FIG. 5 is a schematic block diagram of the path attributes.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 508. In particular, the attribute type subfield 504 specifies a plurality of attribute type codes, examples of which include an autonomous system (AS) path, a multi-exit discriminator (MED) code and a communities attribute, which is a set of opaque 32-bit tags that can apply to a route. The MED is an optional non-transitive attribute having a value that may be used by an updating BGP router's decision algorithm to discriminate among multiple exit points to a neighboring autonomous system, as described further herein. Note that the path attributes are derived from a combination of configuration and protocol (i.e., propagated from the BGP protocol) information.

BGP Architecture

Figure 6:
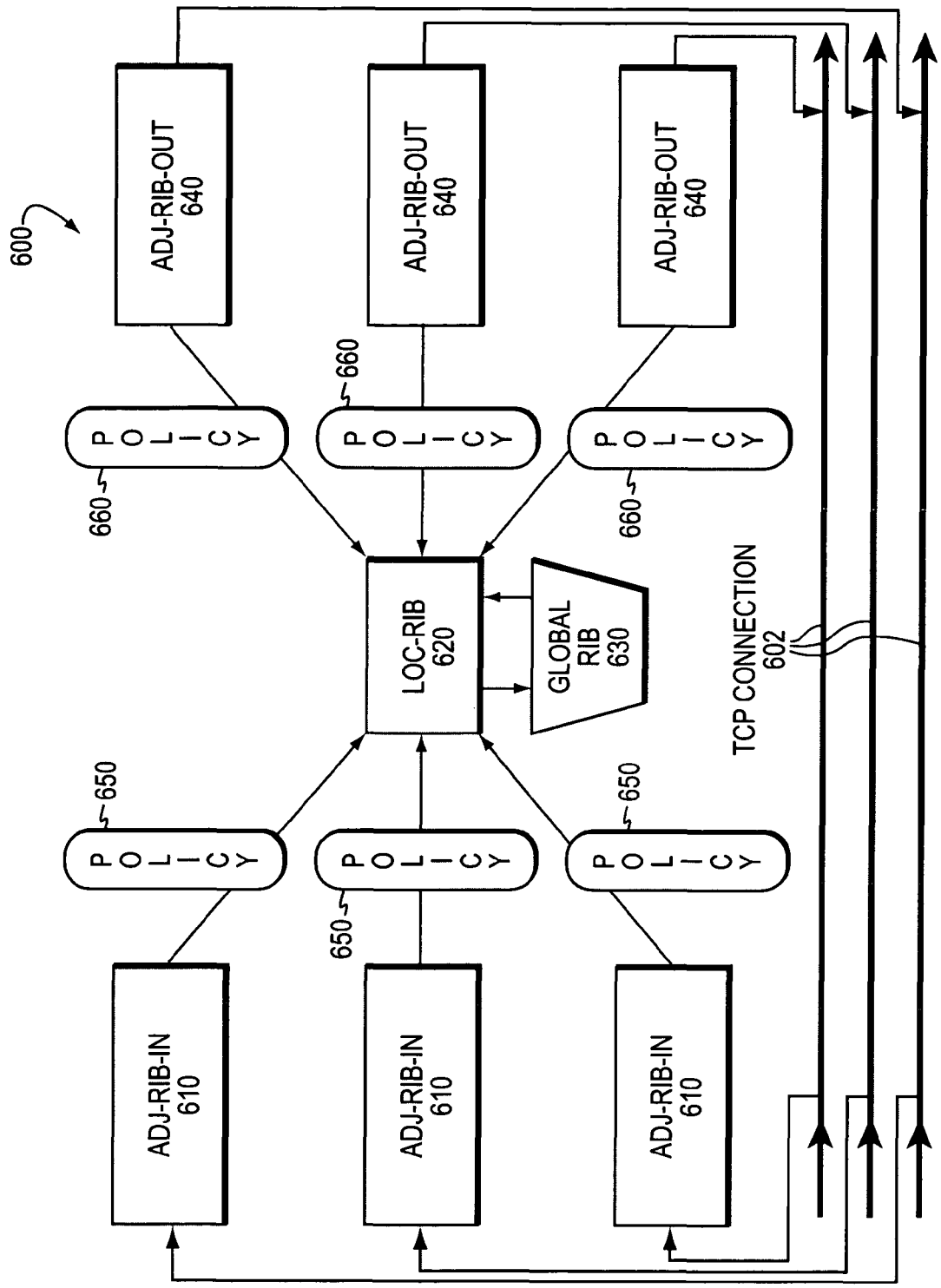
FIG. 6 is a schematic block diagram illustrating the architecture of the BGP protocol.

FIG. 6 is a schematic block diagram illustrating the architecture of the BGP protocol. Peers announce routing updates via TCP connections 602. The BGP protocol "listens" for routing update messages 400 and stores all learned routes for each connection in a BGP database. The BGP database is illustratively organized as Adjacency RIB In (Adj-RIB-In 610), Adjacency RIB Out (Adj-RIB-Out 640) and local RIB (loc-RIB 620). Each peer/TCP connection 602 is associated with an Adj-RIB-In 610 and an Adj-RIB-Out 640. Note that this association is a conceptual data construct; there is typically not a separate Adj-RIB-In/-Out database for each peer.

The BGP protocol runs inbound policy on all routes "learned" for each connection 602 and those routes that match are stored in an Adj-RIB-In 610 unique to that connection. Additional inbound policy 650 (filtering) is then applied to those stored routes, with a potentially modified route being installed in the loc-RIB 620. The loc-RIB 620 is generally responsible for selecting the best route per prefix from the union of all policy-modified Adj-RIB-In routes, resulting in routes referred to as "best paths". The set of best paths is then installed in the global RIB 630, where they may contend with routes from other protocols to become the "optimal" path ultimately selected for forwarding. Thereafter, the set of best paths have outbound policy 660 run on them, the result of which is placed in appropriate Adj-RIB-Outs 640 and announced to the respective peers via the same TCP connections 602 from which routing update messages 400 were learned.

Many of the functions or tasks performed within the BGP protocol are performed on distinct subsets of routing data, independently from one another. These tasks include (1) tracking the state of each peer according to the BGP Finite State Machine (FSM), described in draft-ietf-idr-bgp4-20. txt (Section 8), and responding to FSM events, (2) parsing update messages 400 received from each peer and placing them in an Adj-RIB-In 610 for that peer (Section 3), and (3) applying inbound policy 650 for the peer to filter or modify the received updates in the Adj-RIB-In. The BGP implementation also (4) calculates the best path for each prefix in the set of Adj-RIB-Ins and places those best paths in the loc-RIB 620 (Section 9). As the number of peers increases, the number of paths per-prefix also increases and, hence, this calculation becomes more complex. Additional tasks performed by the BGP implementation include (5) applying outbound policy 660 for each peer on all the selected paths in the loc-RIB to filter or modify those paths, and placing the filtered and modified paths in an Adj-RIB-Out 640 for that peer, as well as (6) formatting and sending update messages 400 to each peer based on the routes in the Adj-RIB-Out for that peer.

Tasks (1), (2), and (3) are defined per peer and operate on routing data learned only from that peer. Performing any of these tasks for a given peer is done independently of performing the same task for any other peers. Task (4) examines all paths from all peers, in order to insert them into the loc-RIB and determine the best path for each prefix. Tasks (5) and (6), like tasks (1), (2) and (3), are defined per peer. While both tasks (5) and (6) must access the set of best paths determined in task (4), they generate routing data for each peer independently of all of the other peers. Thus, the autonomy of each subset of the data and the tasks performed on them lend themselves to distribution across processes or threads in an n-way SMP router, or across nodes in a cluster, so long as each task has access to the required data. The required data includes (i) inbound routes from the peer for tasks (1), (2) and (3); (ii) all paths in all the Adj-RIBs-Ins for task (4); and (iii) a set of best paths for tasks (5) and (6).

The present invention relates to intra-domain notifications received by the local RIB 620 relating to reachability events. As pointed out above, these notifications may be transmitted spontaneously from other nodes within the domain or they may be responses (or non-responses) to scanning of the next-hop nodes by the Internal Border Gateway Protocol (IBGP). Ultimately, these events are processed by the BGP to generate route updates which are then advertised to peers in other domains.

Scanning is scheduled as follows, with reference to FIG. 7. In receipt of notice of a reachability event, successive scans of next-hop nodes within the domain are spaced by a standard minimum scan delay interval, e.g. 30 seconds. If the standard minimum delay expires before the next notice is received, a scan is initiated. If a notice of a reachability event is received before the standard minimum expires, a "penalty" increment is applied to the next scan, so that the next scan will take place upon the expiration of the sum of the standard minimum and the penalty delay, following the next reachability event notification. If another reachability event notification is received before the next scan, another increment is added to the delay. The successive penalty increments can be equal to each other, thereby providing an additive increase to the delays imported to successive scans. Preferably, however, there is an exponential increase in the successive penalty increments, up to a total delay equal to the maximum delay interval. In any case, there is preferably a limit on the delay interval, e.g. 60 seconds, so that scans are not unduly delayed.

The receipt of a rapid succession of reachability events is an indication of churning and the increasing interval between scans helps to reduce this problem. On the other hand, whenever a scan is performed, the scan delay is reduced, preferably by the amount of the most recent increment that was added to the delay interval. Accordingly, when the rate at which the notifications are received decreases, the scanning interval also decreases. Preferably, the scanning delay also decreases with time. If it ultimately decays to zero, the next scan will be performed immediately upon the next notification of a reachability event.

The invention is easily implemented. Assume that the present scan delay is recorded in a memory location, as is the last delay increment included in the scan delay.

Figure 7A:
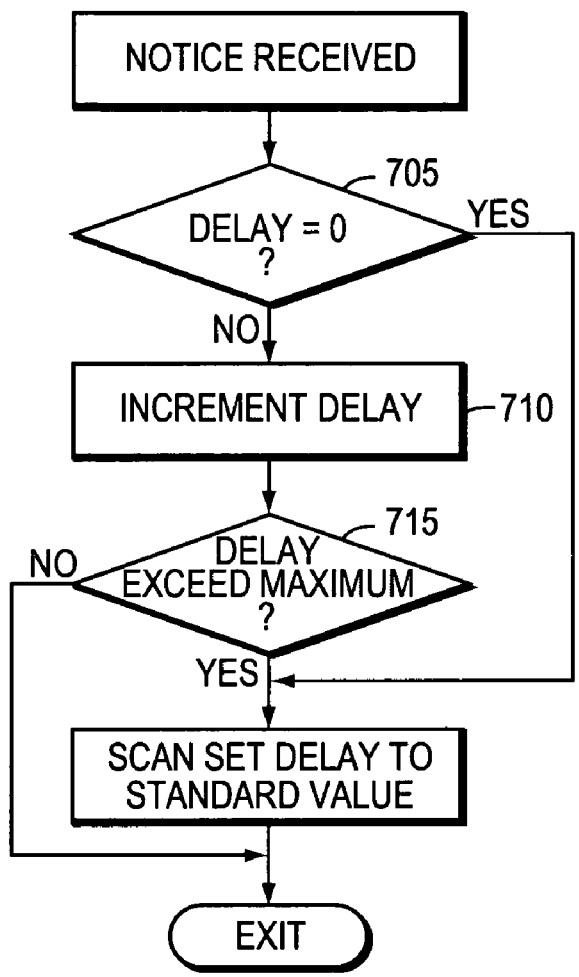
FIGS. 7A and 7B are flow charts illustrating routines that can use to practice the invention.

As shown in FIG. 7A, whenever the node receives a reachability event notification, it checks to ascertain whether the scan delay is zero (box 705). If it is zero, the node proceeds to box 720, where it initiates a scan, sets the delay to the standard value and exits from the routine. If the delay has not decreased to zero, the node adds a penalty increment to the scan delay and proceeds to box 715, where it ascertains whether the new delay exceeds the maximum value. If it does, the routine proceeds to box 720, to initiate a scan set the delay to the standard value and exit from the routine. If the maximum delay has not been exceeded, the routine is terminated immediately.

Figure 7B:
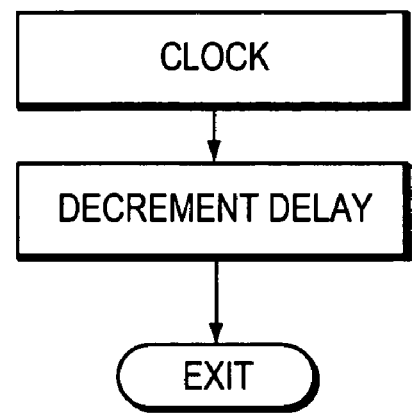

As shown in FIG. 7B, the node periodically decrements the scan delay, preferably by the amount of the most recent increment. It then exists from the routine

What is claimed is:

1. A method comprising:
    assigning an initial scan interval to be a predetermined length of time;
    upon receiving a notice of a reachability event, beginning a delay that extends for the initial scan interval;
    adding a penalty increment to the initial scan interval for each of one or more notices of reachability events received during the delay that extends for the initial scan interval, to produce a next scan interval;
    after expiration of the delay that extends for the initial scan interval, performing, by a processor, an initial scan of a routing information base (RIB); and upon receiving another notice of a reachability event subsequent to completion of the initial scan, beginning a delay that extends for the next scan interval and scheduling a next scan to take place after the expiration of the next scan interval, such that the next scan does not take place until at least an amount of time equal to the next scan interval has passed after receiving the another notice of a reachability event.

2. The method as defined in claim 1 wherein the penalty increments added for each notice of reachability event are equal to each other.

3. The method as defined in claim 1 wherein the penalty increments added for each notice of reachability event are exponentially larger with each successive penalty increment.

4. The method as defined in claim 1 further comprising:
preventing the next scan interval from exceeding a predetermined value.

5. The method as defined in claim 1 further comprising:
in response to performing the scan, reducing the next scan interval by an amount.

6. The method as defined in claim 1 further comprising:
in response to an elapse of time before performing the next scan, reducing the next scan interval by an amount.

7. The method as defined in claim 1 wherein the notices of reachability events comprise Border Gateway Protocol (BGP) notifications and the RIB is a BGP local RIB.

8. The method as defined in claim 1 further comprising:
adding a penalty increment to the next scan interval for each of one or more notices of reachability events received during the delay that extends for the next scan interval; and
after expiration of the delay that extends for the next scan interval, performing a scan of the routing information base (RIB).

9. An apparatus comprising:
an interface to receive notices of reachability events;
a memory to store executable instructions;
a processor to execute the instructions to,
assign an initial scan interval to be a predetermined length of time,
upon receipt of a notice of a reachability event, begin a delay that extends for the initial scan interval,
add a penalty increment to the initial scan interval for each of one or more notices of reachability events received during the delay that extends for the initial scan interval, to produce a next scan interval,
after expiration of the delay that extends for the initial scan interval, perform a scan of a routing information base (RIB), and
upon receipt of another notice of a reachability event subsequent to completion of the initial scan, begin a delay that extends for the next scan interval and schedule a next scan to take place after the expiration of the next scan interval, such that the next scan does not take place until at least an amount of time equal to the next scan interval has passed after receipt of the another notice of a reachability event.

10. The apparatus as defined in claim 9 wherein the penalty increments added for each notice of reachability event are equal to each other.

11. The apparatus as defined in claim 9 wherein the penalty increments added for each notice of reachability event are exponentially larger with each successive penalty increment.

12. The apparatus as defined in claim 9 wherein the processor is further operable to prevent the next scan interval from exceeding a predetermined value.

13. The apparatus as defined in claim 9 wherein the processor is further operable to reduce the next scan interval by an amount in response to performance of the scan.

14. The apparatus as defined in claim 9 wherein the processor is further operable to reduce the next scan interval by an amount in response to an elapse of time before performance of the next scan.

15. The apparatus as defined in claim 9 wherein the notices of reachability events comprise Border Gateway Protocol (BGP) notifications and the RIB is a BGP local RIB.

16. A non-transitory computer readable storage media storing software that, when executed on a processor, is operable to:
assign an initial scan interval to be a predetermined length of time;
upon receipt of a notice of a reachability event, begin a delay that extends for the initial scan interval;
add a penalty increment to the initial scan interval for each of one or more notices of reachability events received during the delay that extends for the initial scan interval, to produce a next scan interval;
after expiration of the delay that extends for the initial scan interval, perform an initial scan; and
upon receipt of another notice of a reachability event subsequent to the initial scan, begin a delay that extends for the next scan interval and schedule a next scan to take place after the expiration of the next scan interval, such that the next scan does not take place until at least an amount of time equal to the next scan interval has passed after receipt of the another notice of a reachability event.

17. The non-transitory computer readable storage media in claim 16 wherein the penalty increments added for each notice of reachability event are equal to each other.

18. The non-transitory computer readable storage media in claim 16 wherein the penalty increments added for each notice of reachability event are exponentially larger with each successive penalty increment.

19. The non-transitory computer readable storage media in claim 16, wherein the software is further operable to:
prevent the next scan interval from exceeding a predetermined value.

20. The non-transitory computer readable storage media in claim 16, wherein the software is further operable to:
in response to performance of the scan, reduce the next scan interval by an amount.

21. The non-transitory computer readable storage media in claim 16, wherein the software is further operable to:
in response to an elapse of time before performance of the next scan, reduce the next scan interval by an amount.

* * * * *

UNITED STATES PATENT AND TRADEMARK OFFICE
CERTIFICATE OF CORRECTION

| | | |
|---|---|---|
| PATENT NO. | : 7,969,907 B2 | Page 1 of 1 |
| APPLICATION NO. | : 11/059010 | |
| DATED | : June 28, 2011 | |
| INVENTOR(S) | : Himanshu Shah | |

It is certified that error appears in the above-identified patent and that said Letters Patent is hereby corrected as shown below:

Col. 6, line 54 correct as follows: "It then ~~exists~~ exits from the routine."

Signed and Sealed this
Third Day of January, 2012

David J. Kappos
*Director of the United States Patent and Trademark Office*